Jan. 19, 1943.     H. J. BRUSHABER ET AL     2,308,641
CONDUIT FITTING
Filed May 19, 1941

INVENTOR.
HERMAN J. BRUSHABER
BY OTTO PRAHL
Christian R. Nielsen
ATTORNEY.

Patented Jan. 19, 1943

2,308,641

UNITED STATES PATENT OFFICE 2,308,641

CONDUIT FITTING

Herman J. Brushaber and Otto Prahl, Milwaukee, Wis.

Application May 19, 1941, Serial No. 394,214

3 Claims. (Cl. 285—6.5)

Our invention refers to conduit fittings and more particularly to a type of fitting that may be employed as a coupling for connecting conduit tubing to a fixture receptacle commonly referred to as a conduit box, or as a union or connection between two pieces of conduit.

The object of our invention is to provide a means of rigidly clamping the outer circumferential area of conduit tubing and rigidly supporting it to the outer wall of a receptacle or the like.

Another object of our invention is to so construct this means as to eliminate the cutting of a thread on the end of the conduit tube.

A still further object of our invention is to provide a means of connecting two ends of conduit without cutting a thread on the conduit.

A further object of our invention is to provide a thimble that may be constructed of a single piece of metal if desired and used in combination with a threaded member having an internal thread provided with means for cutting its own thread on the outer surface of the thimble.

Figure 1:
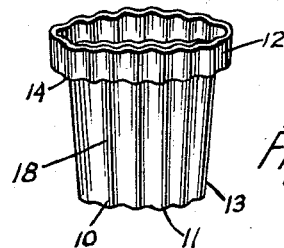
Figure 3:
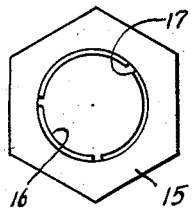
Figure 2:
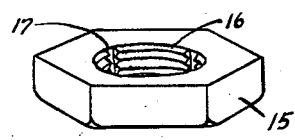
Figure 4:
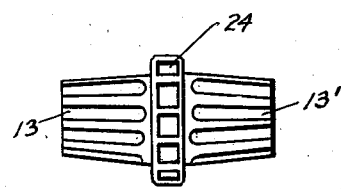
Figure 5:
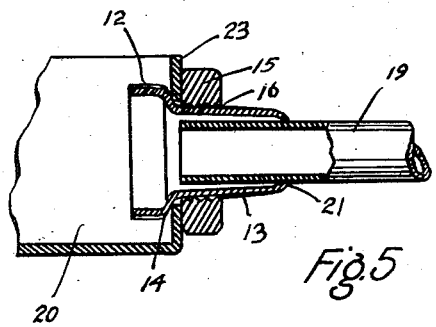
Figure 6:
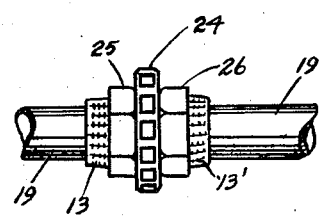
Figure 7:
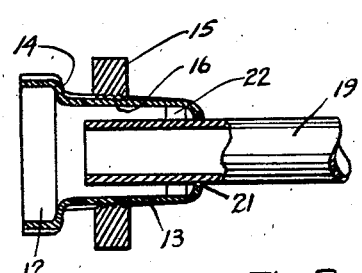

Other and further objects of our invention will become more apparent as the description proceeds, when taken in conjunction with the drawing in which Figure 1 is a perspective view of a thimble, Figure 2 is a perspective view of a threaded member disposed for engagement with the outer surface of the thimble shown in Figure 1, Figure 3 is a plan view of the threaded member shown in Figure 2 illustrating the manner in which the threaded portion is grooved to act as a thread cutting means, Figure 4 shows a double thimble, Figure 5 is a fragmentary cross-sectional view of the single type thimble clamping a section of conduit and attaching it to a conduit box or receptacle, Figure 6 is a perspective view of a double thimble arrangement employed to attach two pieces of conduit one to the other, and Figure 7 is a cross-sectional view illustrating the manner in which a washer of pliable material may be employed to assist in clamping the outer surface of the conduit.

Similar characters of reference indicate corresponding parts throughout the several views, and referring now to the same, the character 10 shows a thimble consisting of a shell having its walls serrated as shown at 11, and consisting of a collar portion 12 and a tapered portion 13. The collar portion 12 being of a larger diameter than the tapered portion 13 produces a shoulder 14. This thimble 10 although shown as a single stamping may be constructed in sections if desired for the convenience in assembly.

There is a threaded portion 15 commnoly referred to as a nut, having an internal thread 16 which thread is provided with a plurality of grooves 17 disposed transversely to the threads. The sharp edges of the threads at these grooves provide a cutting means when the nut is applied over the tapered portion 13 of the thimble 10, and as the nut 15 is revolved the ends of the thread at the grooves 17 in the nut 15 will cut a threaded indentation into the raised portions of the serrations 11 as shown at 18 in Figure 1.

In Figure 5 is shown the manner in which the device is applied when clamping a section of conduit 19 and supporting it to a receptacle 20 through an aperture in the wall of the receptacle. The tapered section 13 of the thimble is shown having an inwardly projecting section 21 at its depending end contacting the outer circumferential area of the conduit 19 when the member 15 is drawn up on the tapered section 13. As the outer surface of the conduit is usually quite uneven this feature adds very materially to make a tight joint or contact.

Another means that may be employed is a washer 22 made of pliable material inserted between the inner surface of the thimble 10 and the outer surface of the conduit 19 as shown in Figure 7.

Obviously the shoulder 14 caused by the collar portion 12 inside of the receptacle 20 and the surface of the threaded member 15 will securely clamp the wall 23 of the receptacle 20.

In like manner the thimble 10 may be of dual construction as shown in Figure 4 in which there are two tapered portions 13 and 13' and the collar portion 24 may be employed as a retaining means for a wrench or the like when attaching the two threaded members 25 and 26 thereby joining two pieces of conduit 19 as shown in Figure 6.

It is manifest to anyone familiar with the art that this device may be constructed very economically of a single piece of material or a plurality of sections, and when the threaded member 15 is treated in a manner commonly referred to as case hardening, the sharp edges of the threads 16 at the grooves 17 will definitely cut threads on the raised portion of the serrations 11 when the threaded member is applied to the tapered section 13.

In the chosen embodiments of our invention there are present many new and novel features not heretofore revealed in the prior art, and we do not wish to be confined to or limited to the single construction shown, for many changes may be made in the construction of the device without departing from the scope of the invention or the appended claims.

Having thus described our invention, what we claim and desire to secure by Letters Patent in the United States is:

1. A device of the character described comprising in combination a thimble, said thimble consisting of a collar section, said collar section provided with flat surfaces opposite one another, a tapered section integral with said collar, said tapered section having its depending end smaller in diameter than the end adjacent to said collar, the outer circumferential surface of said tapered section serrated longitudinally, a threaded member, said member provided with an internal thread having grooves transversely disposed, said threads being of a diameter slightly larger than the diameter of said tapered section and permitting engagement therewith.

2. A device of the character described comprising a thimble having a collar portion having flat surfaces on its outer periphery, a tapered portion of smaller diameter than said collar portion formed integrally therewith, said tapered portion being of a smaller diameter at its depending end than at the end adjacent said collar, the outer surface of said tapered portion serrated longitudinally, the smaller end of said tapered portion inwardly disposed for contact with conduit inserted therein and a threaded member having an internal thread of a diameter slightly larger than the depending end of said tapered portion of said thimble, said thread provided with grooves transversely disposed permitting the ends of said thread to act as a cutting means when spirally applied to the tapered end of said thimble.

3. A device of the character described comprising in combination a thimble consisting of a pair of tapered sections, a collar section of a larger diameter than the large end of said tapered section and disposed integrally with and between the tapered sections, said tapered sections being serrated longitudinally at their outer area, the small depending end of said tapered section being inwardly disposed for contact with conduit when inserted therein, and threaded members having an internal thread of a diameter slightly larger than the depending ends of said tapered sections, said thread provided with grooves transversely disposed thereby permitting the ends of said thread to act as a cutting means when spirally applied to the tapered end of said thimble.

HERMAN J. BRUSHABER.
OTTO PRAHL.